May 28, 1946.　　S. F. ARMINGTON ET AL　　2,401,036
TRACTOR-TRAILER HITCH
Filed Jan. 21, 1944　　3 Sheets-Sheet 1

INVENTORS
STEWART F. ARMINGTON
WALTER F. DOUBLE
By Hyde and Meyer.
ATTORNEYS.

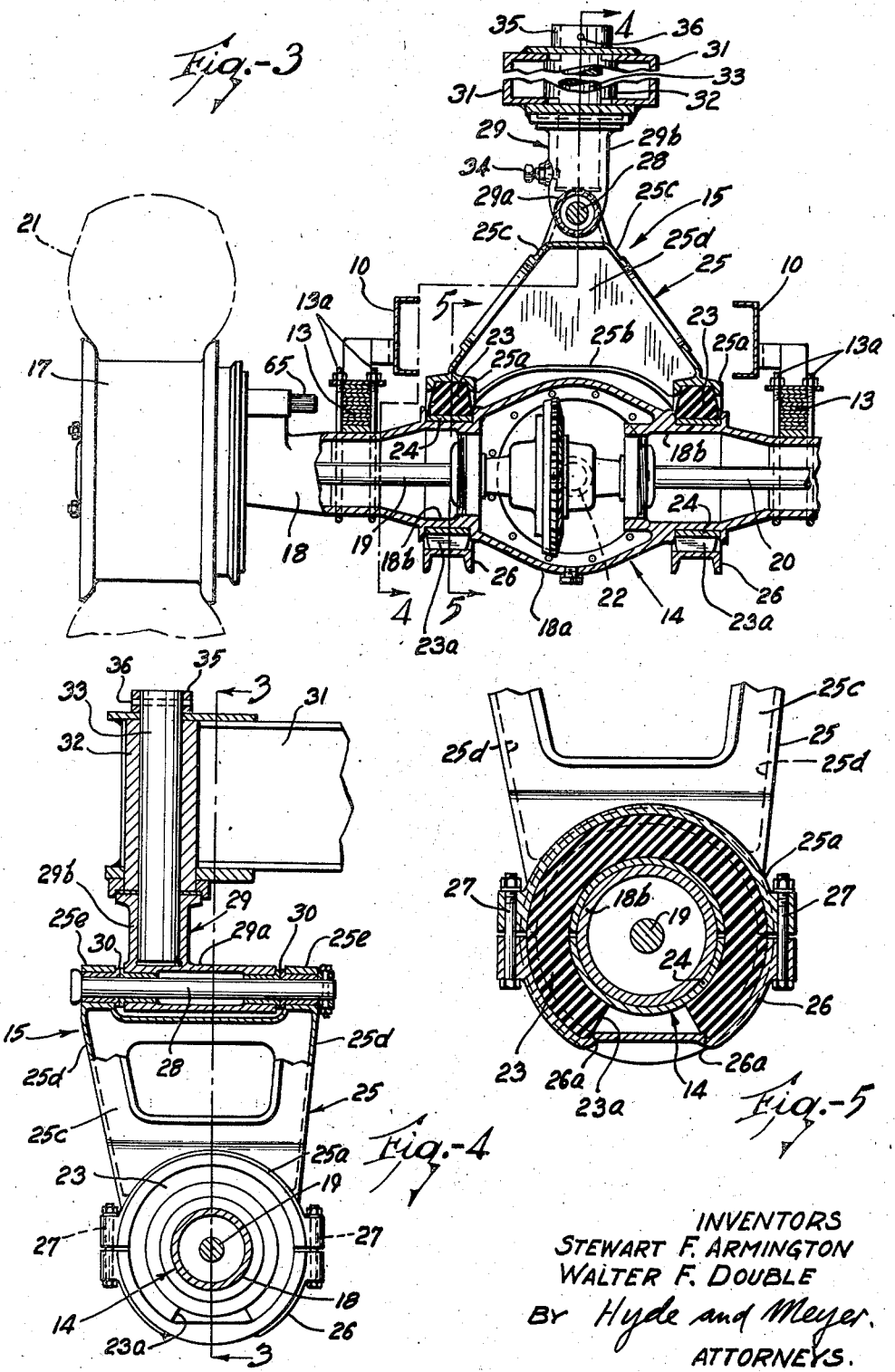

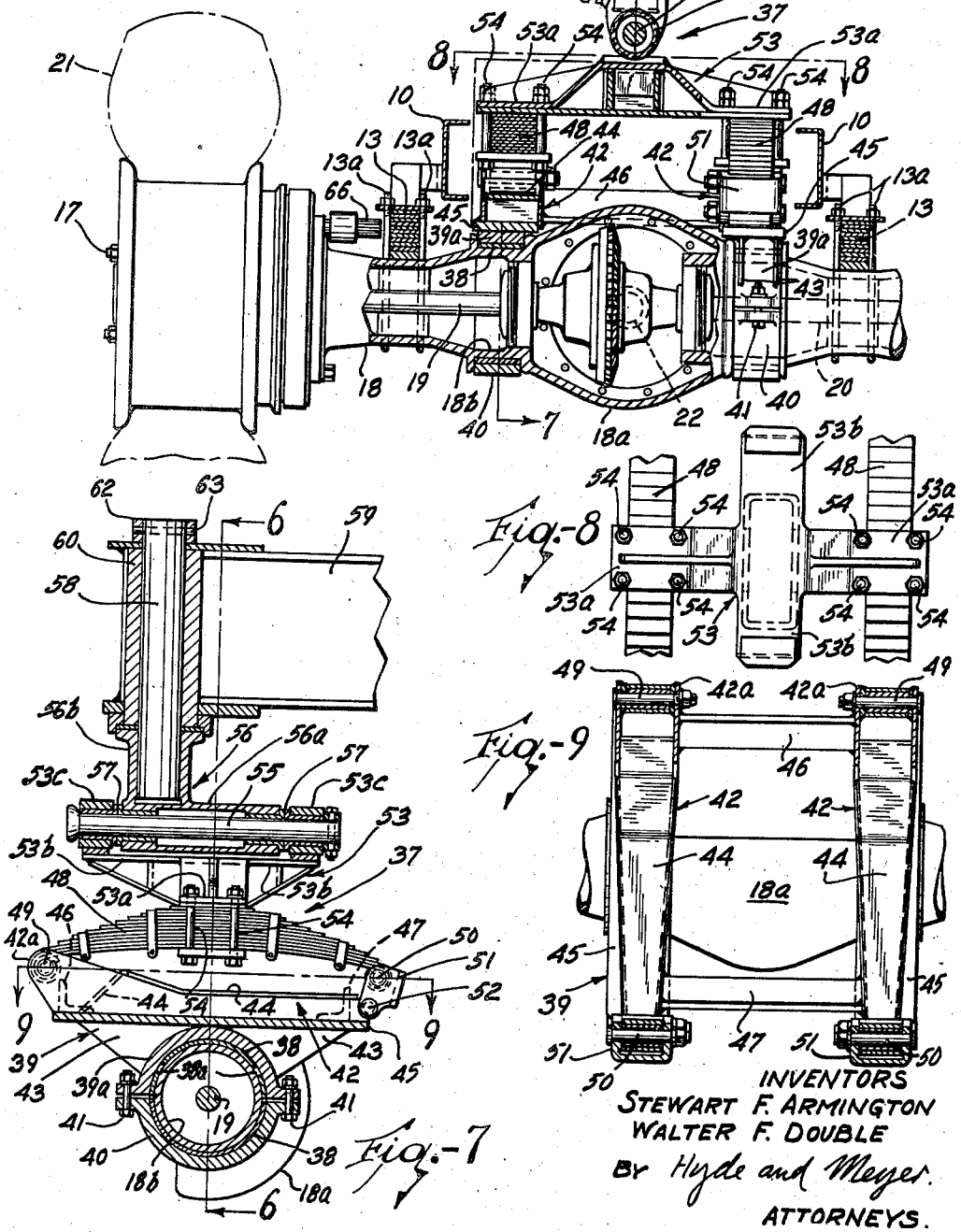

Patented May 28, 1946

2,401,036

UNITED STATES PATENT OFFICE 2,401,036

TRACTOR-TRAILER HITCH

Stewart F. Armington, Willoughby, and Walter F. Double, Wickliffe, Ohio, assignors to The Euclid Road Machinery Co., Euclid, Ohio, a corporation of Ohio Application January 21, 1944, Serial No. 519,090

2 Claims. (Cl. 280—33.1)

This invention relates to a novel hitch for a trailer vehicle mounted directly upon the axle of a tractor vehicle so that a light duty tractor may be utilized for heavy duty hauling.

An object of the present invention is to provide a heavy duty axle on a tractor device normally designed for light duty only, with hitch means for a trailer vehicle mounted directly upon the heavy duty axle.

Another object of the present invention is to provide cushioning means between the trailer vehicle and an axle of a tractor vehicle, together with cushioning means independent of the tractor device for resiliently carrying the trailer load on the tractor axle.

Another object of the present invention is to so mount a trailer device and its hitch means with respect to the axle of a tractor device that the movements of the trailer device are transmitted through the axle to the ground without stresses and strains following upon the usual springs and wheels of the tractor device.

Our invention has the further object of providing hitch means directly between a trailer and an axle of a tractor with proper provision for all movements of the trailer which may occur in off the highway hauling duty without placing any strain on the tractor parts other than the said axle.

Other objects and advantages of the present invention will be apparent from the accompanying drawings and specification and the essential features thereof will be set forth in the appended claims.

In the drawings,

Fig. 3 is an enlarged sectional view taken along the line 3—3 of Figs. 2 and 4, with one of the wheels omitted;

Fig. 4 is a sectional view of the same taken along the line 4—4 of Fig. 3;

Fig. 5 is a fragmental sectional view taken along the line 5—5 of Fig. 3;

Fig. 6 is a view similar to Fig. 3 taken along the line 6—6 of Fig. 7 and showing a modification of the device;

Fig. 7 is a sectional view taken along the line 7—7 of Fig. 6;

Fig. 8 is a fragmental sectional view taken along the line 8—8 of Fig. 6; while

Fig. 9 is a sectional view taken along the line 9—9 of Fig. 7.

We have discovered that light duty commercial highway trucks may be adapted for heavy duty hauling either on or off the highway. Normally the light duty highway truck of the type we have in mind is designed for loads of the order of one and a half tons, and obviously, if heavy loads were carried on such commercial trucks, they would break down immediately or after a very short life. Our invention contemplates the substitution of a heavy duty axle on the highway truck and the mounting of a heavy duty trailer by suitable hitch means directly upon the heavy duty axle so that this axle takes all the punishment of the heavy load, relieving the tractor of all such load save for the pulling of the same.

Figure 1:
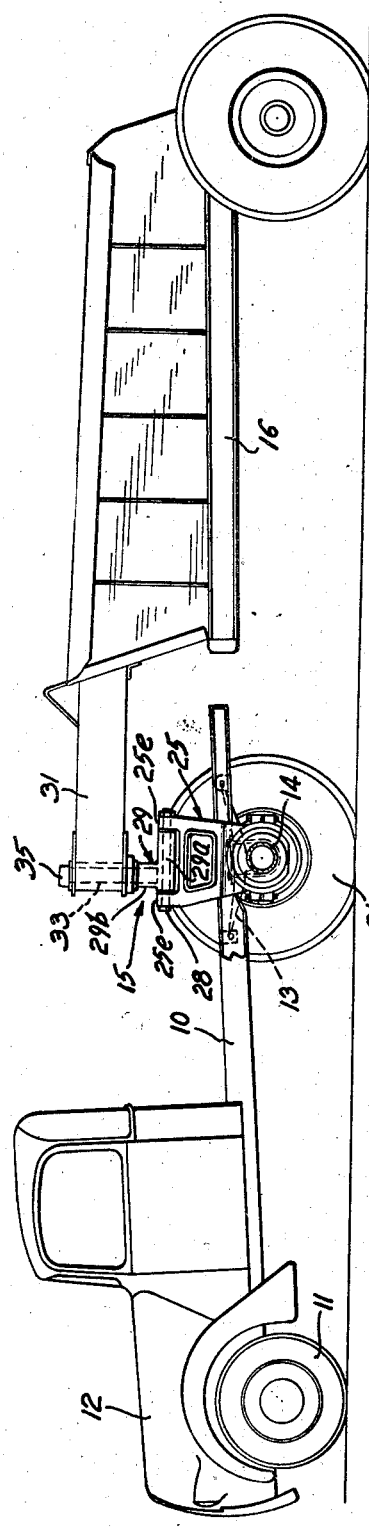
Fig. 1 is an elevational view showing our novel combination of a light duty tractor and a heavy duty trailer, with a portion of the rear end of the tractor broken away to more clearly disclose the arrangement.

In Fig. 1 we have shown a tractor device having a frame 10 mounted on front wheels 11 having the usual light duty axle mountings usually provided in such cases and having the usual commercial engine under the conventional hood 12. The rear springs indicated at 13 are those usually utilized to mount the rear end of frame 10 upon the usual light commercial truck wheel and axle means. In place of this usual rear wheel and axle means we have substituted the heavy duty axle 14 in a manner presently described. Directly upon this heavy duty axle is mounted the hitch means indicated generally at 15 and this provides the sole support for the forward end of a heavy duty trailer vehicle indicated at 16. It should be understood that the vehicle here shown is of the general type disclosed in United States Letters Patent 2,233,193, granted February 25, 1941 to George E. and Stewart F. Armington, but other trailer devices may be used in the same manner. For instance, whereas the vehicle 16 is a bottom dump hauling wagon, there could be substituted a side dump or a rear dump hauling wagon. Another trailer device which could be used in place of the dump wagon 16 would be the scraper disclosed in United States Letters Patent 2,304,786, granted December 15, 1942 to Stewart F., Raymond Q. and George E. Armington.

Figure 2:
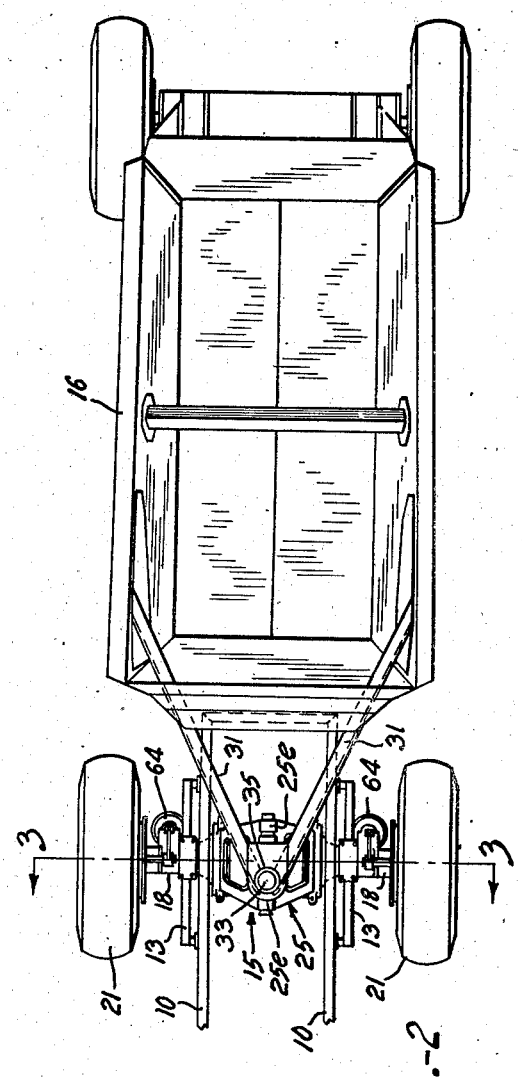
Fig. 2 is a top plan view of the rear portion of Fig. 1.

Referring now to Figs. 3 to 5, as showing in greater detail the construction of Figs. 1 and 2, a heavy duty axle construction indicated generally at 14 is substituted for the usual light duty axle of the commercial truck. This axle may be of the general type disclosed in United States Letters Patent 2,222,697, granted November 26, 1940, to Stewart F. Armington and Virgil L. Snow, or any other axle suitable for carrying heavy loads and particularly over rough ground, if necessary. An axle of this general type will support a load of from eight to ten tons. The axle here shown is of the full floating type wherein the wheel 17 (and a like wheel on the other end of the axle, not shown) is supported on a rigid housing 18. The housing 18 is connected by bolts 13a with the light commercial truck spring 13, which in turn is mounted on the truck frame 10. Within the housing are the axles 19 and 20 which have driving connections, not shown, with the wheel 17. Preferably, between the axle 19 and the wheel 17 reduction gearing is provided as shown in the above mentioned patent. This is advisable because the wheels 17 are of a type to carry a heavy duty tire 21. These tires are low pressure tires of large diameter, say of the order of five or six feet. These tires are able to carry the heavy axle and the heavy trailer load and give better tractive effort when the going is rough or slippery. The usual drive shaft of the commercial truck is indicated schematically at 22, Fig. 3, and is driven by the engine under the hood 12 in the usual manner. These parts are so well known that further showing of the same is deemed unnecessary. On opposite sides of the central or banjo portion 18a of the housing 18 (in which is housed the usual differential driving mechanism) are provided cylindrical housing portions 18b. Surrounding these cylindrical housing portions are resilient rings 23 of rubber or the like. Preferably, these resilient rings are mounted on the housing by means of annular metal bushings 24. Each of the rubber rings is clamped between a semi-circular bracket portion 25a and a semi-circular cap 26. Bolts 27 hold these parts in embracing position and clearance is provided between the halves of ring 24 and between the parts 25a and 26 so that wear may be taken up. It will be noted from Fig. 5 that the ring 23 has a portion cut away as shown at 23a so that the same may be slipped over the cylindrical housing portion 18b. The free ends of the rubber ring are held in suitably formed pockets 26a of the member 26.

The portion 25a mentioned above, which is clamped on the resilient ring 23, forms the lower part of a bracket 25 which comprises a bottom wall 25b and two side walls 25c which converge upwardly as best seen in Fig. 3 so as to form a generally triangular bracket. The front and rear faces of the bracket are closed by means of plates 25d. At the upper end or apex of the bracket 25 are provided spaced sleeves 25e through which passes a horizontally positioned pivot pin 28.

A second bracket 29 comprises integrally joined horizontal sleeve 29a and vertical sleeve 29b. Sleeve 29a is provided with openings alined with the sleeves 29e so that the pin 28 serves to connect together the brackets 25 and 29. Suitable bushings 30 are provided between the pin 28 and the sleeves 25e and 29a. Mounted on the bracket 29 is the drawbar 31 rigid with the trailer vehicle 16. This drawbar carries a sleeve 32, and pivot pin 33 passes through sleeves 32 and 29b. The pin 33 is held in sleeve 29b by set screw 34 (Fig. 3) and the parts are held together by a nut or ring 35 held on pin 33 by means of the securing pin 36.

It will be noted from the various views that the hitch means trunnions generally about the axle 19. In this way the load is centered on the axle so that there is no reaction on the truck springs either from the weight of the trailer vehicle or from the action in pulling the trailer, or from thrust of the trailer toward the tractor or from applying the brakes, or from the vehicle weight. In this way all of the load reactions from the trailer are insulated from the tractor springs 13. Of course these tractor springs do have to take the driving torque of the tractor and do have to take the fore and aft thrusts which are caused by the weight of the tractor chassis when it is stopped by the wheel brakes. This hitch has maximum flexibility. The front end of the tractor vehicle can raise or lower any reasonable amount with the hitch oscillating about the axle as a center. This is important when operating over rough ground. Lateral flexibility is provided by the horizontally positioned pivot pin 28. This permits the trailer vehicle to oscillate from side to side over rough ground without disturbing the tractor vehicle. This pin 28 is placed relatively high so that the trailer vehicle has stability. Relative turning movement between the tractor and trailer is provided by the vertically disposed pivot pin 33. Such turning movement is limited only by the tractor striking the trailer when it has turned past the 90° point.

In Figs. 6 to 9 we have shown a modified form of our device wherein similarly numbered parts are like those previously described. Here again, wheels 17, carrying large tires 21, are mounted on the rigid axle housing 18 within which are the driving axles 19 which are drivingly connected with the drive shaft 22 of the commercial truck. The usual light truck springs 13 are connected with the truck frame 10 and the housing 18 is connected with the springs 13 by means of bolts 13a. On opposite sides of the banjo portion 18a of the housing are provided cylindrical portions 18b on the housing 18. The hitch means indicated generally at 37 is mounted for oscillation about the cylindrical portions 18b by means best shown in Figs. 6 and 7.

Next to the cylindrical portions 18b are semi-circular bushing members 38, one of which is provided with openings for oiling as indicated at 38a. Clampingly embracing this bushing are the substantially semi-circular portion 39a of bracket 39 and a mating semi-circular cap 40. These parts are clamped together by the bolts 41. A slight clearance is indicated between the semi-circular portions so that wear may be taken up when necessary. This construction is identical on both sides of the center line so that one only need be described.

The bracket 39 comprises two generally parallel channel or box beam members 42, each one lying substantially directly over one of the semi-circular clamp portions 39a and connected thereto by reinforcing gussets 43. Each side member has a reinforcing cover plate 44 which is welded to the bottom plate 45 at the forward end (or at the left-hand side of Fig. 7) and along the top the plate 44 is welded to the side plates of the members 42. The members 42 are rigidly cross connected by a reinforcing angle 46 at the front and 47 at the rear. This provides a very strong unitary bracket.

Each member 42 carries a heavy duty leaf spring 48. The main leaf of each spring at the front end embraces a pin 49 held between ears 42a of the member 42. Each main leaf spring at the rear end embraces a pin 50 which is mounted in a shackle 51 which in turn is pivotally connected to the member 42 by the pin 52.

Above the springs 48 is a bracket 53 generally of cross shape as best seen in Fig. 8. The lateral arms 53a of this bracket overlie the springs 48 and are secured thereto by the bolts 54. The forwardly and rearwardly extending arms 53b of bracket 53 integrally or rigidly support the sleeve members 53c through which passes the horizontally disposed pivot pin 55.

Another bracket 56 comprises the rigidly connected sleeve portions 56a and 56b which extend at right angles to each other. The portion 56a is bored to receive the pin 55. Thus, the brackets 56 and 53 are connected together along a horizontal axis. Suitable bushings 57 are interposed between the sleeves 53c, 56a and the pin 55.

A vertically disposed pivot pin 58 serves to connect bracket 56 with the drawbar 59 of a trailer vehicle. This drawbar carries a sleeve 60, the opening of which is alined with the opening of sleeve 56b. Pin 58 passes through both of these sleeves and is held in sleeve 56b by means of the set screw 61 (Fig. 6). The parts are held together by a nut or collar 62 which is pinned in place by pin 63.

It results from the above construction that a result is obtained very like that described in connection with the first modification. Movements of the trailer vehicle which tend to cause oscillation of the hitch means 37 in a vertical plane at right angles to housing 18 are accommodated by oscillation of the hitch generally about the cylindrical housing portions 18b. Such movements are cushioned by the springs 48. Lateral oscillations of the trailer vehicle are accommodated in part through the movement of springs 48 and in part by movement of the hitch about the horizontally disposed pin 55. Relative turning movement between the tractor vehicle and the trailer vehicle is accommodated by the vertically disposed pin 58.

It will be noted that in Figs. 3 to 5 rubber or other resilient material provides a cushioning effect located adjacent the housing 18. In the modification shown in Figs. 6 to 9 the leaf springs 48 provide the cushioning effect and they are located between two of the interconnected brackets of the hitch means. These two embodiments are shown to illustrate that the cushioning means may be supplied by the use of various materials located in various positions, it only being necessary that suitable resilience be provided for fore and aft and side to side movements, all of course capable of sustaining the heavy loads involved.

One of the advantages of using the heavy duty axle here disclosed is that steering by braking may be utilized where desired. In the various views the brakes are not shown but are on the usual location, that is to say, brake drums are provided adjacent each wheel 17. The power actuators for the brakes are shown at 64 in Fig. 2 and are connected to the members 65 and 66 of Figs. 3 and 6 respectively, it being understood that one is provided for each wheel. This feature assists in turning sharp corners and in getting through bad ground conditions.

What we claim is:

1. In combination, a tractor, wheel means for said tractor, drive axle means for said wheel means, a rigid axle housing supported by said wheel means, a drive shaft normal to said axle means, a trailer, said housing having substantially cylindrical portions on opposite sides of said drive shaft, a bracket having substantially circular portions surrounding and embracing and oscillatable upon said cylindrical portions, two parallel leaf springs extending in a fore-and-aft direction and having their ends mounted on said bracket, one spring over each of said circular portions, a second bracket mounted on the central portions of said leaf springs, a third bracket above said second bracket, a pin extending in a fore-and-aft direction and pivotally connecting said second and third brackets, a vertically extending pin in said third bracket, and said last named pin pivotally connecting said third bracket to said trailer.

2. In the combination of a tractor having a substantially rigid rear axle housing and a trailer, said housing having a cylindrical portion, hitch means comprising a first bracket embracing said cylindrical portion and oscillatable thereupon, leaf spring means extending in a fore-and-aft direction and having its ends mounted upon said bracket, a second bracket mounted on the mid-portion of said spring means, a third bracket above said second bracket, pivot means extending in a fore-and-aft direction and pivotally connecting said second and third brackets, and vertically extending pivot means carried by said third bracket and connecting the latter with said trailer.

STEWART F. ARMINGTON.
WALTER F. DOUBLE.